Dec. 18, 1923. 1,477,728
W. H. STEPHENSON
GAUGE AND FILLER SPOUT FOR GASOLINE TANKS
Filed Oct. 9, 1922 3 Sheets-Sheet 2
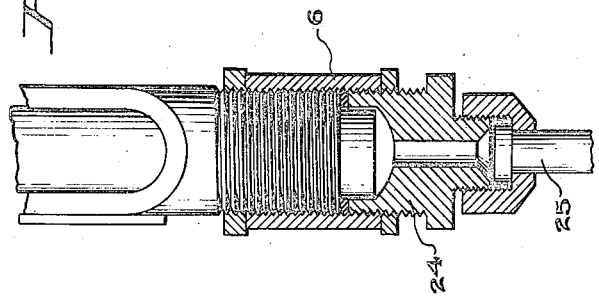
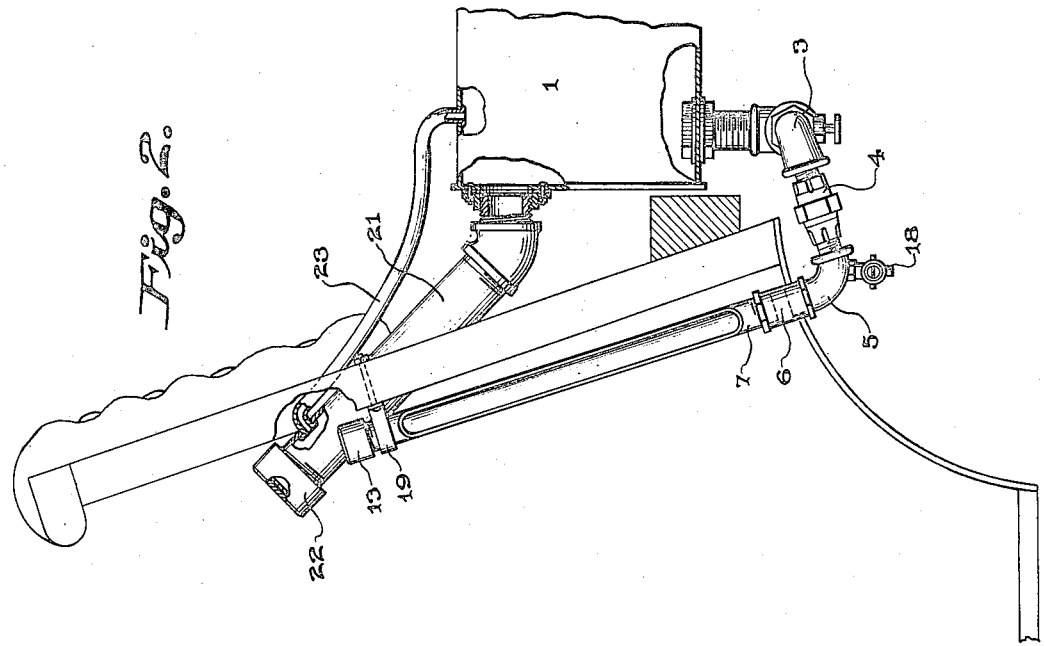
Inventor
W. H. Stephenson
Witnesses Dec. 18, 1923.  
W. H. STEPHENSON  
GAUGE AND FILLER SPOUT FOR GASOLINE TANKS  
Filed Oct. 9, 1922    3 Sheets-Sheet 3  
1,477,728
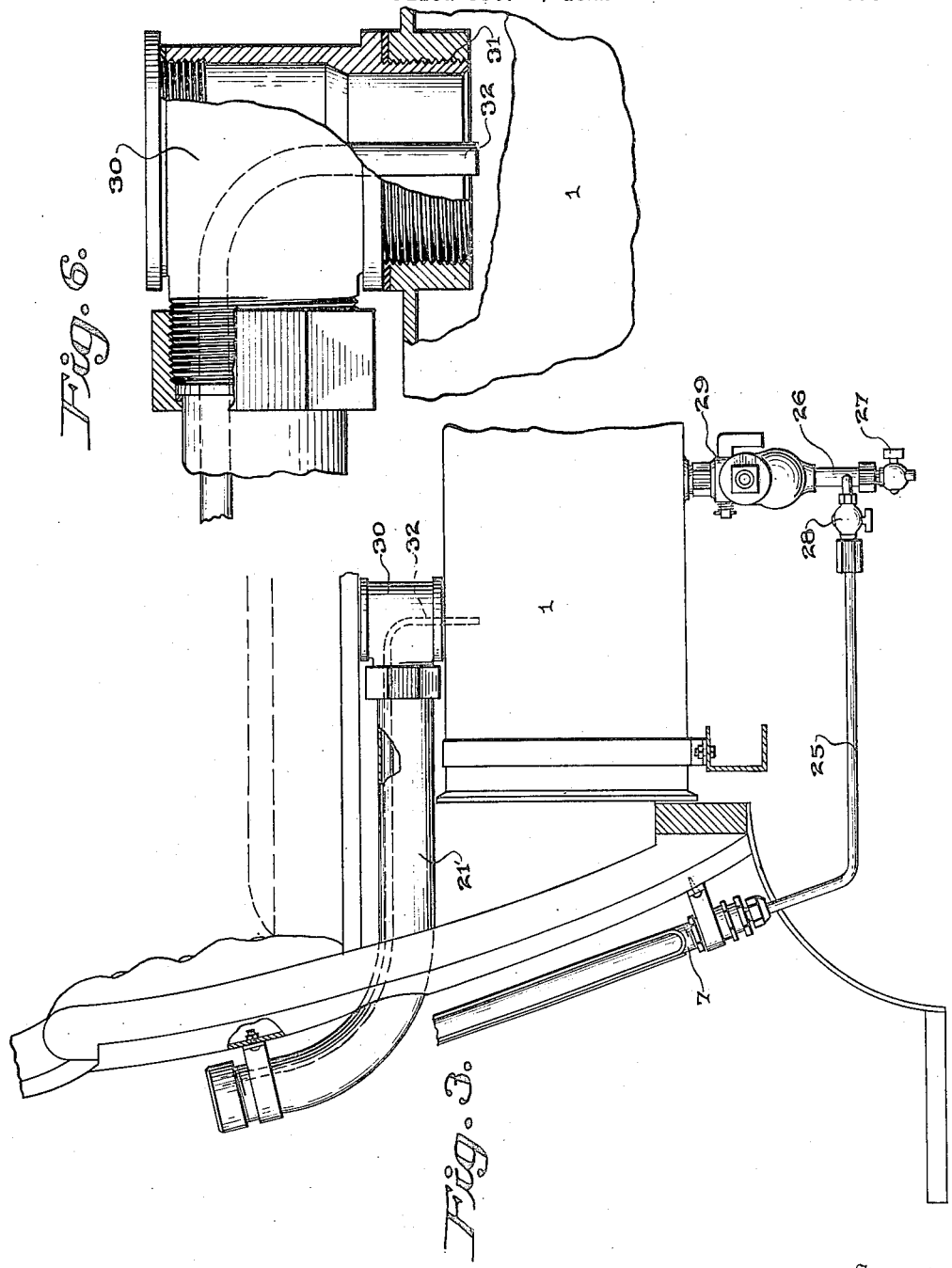
Inventor  
W. H. Stephenson  
By Clarence A. O'Brien  
Attorney
H. Berman  
H. A. LaClair  
Witnesses Patented Dec. 18, 1923.

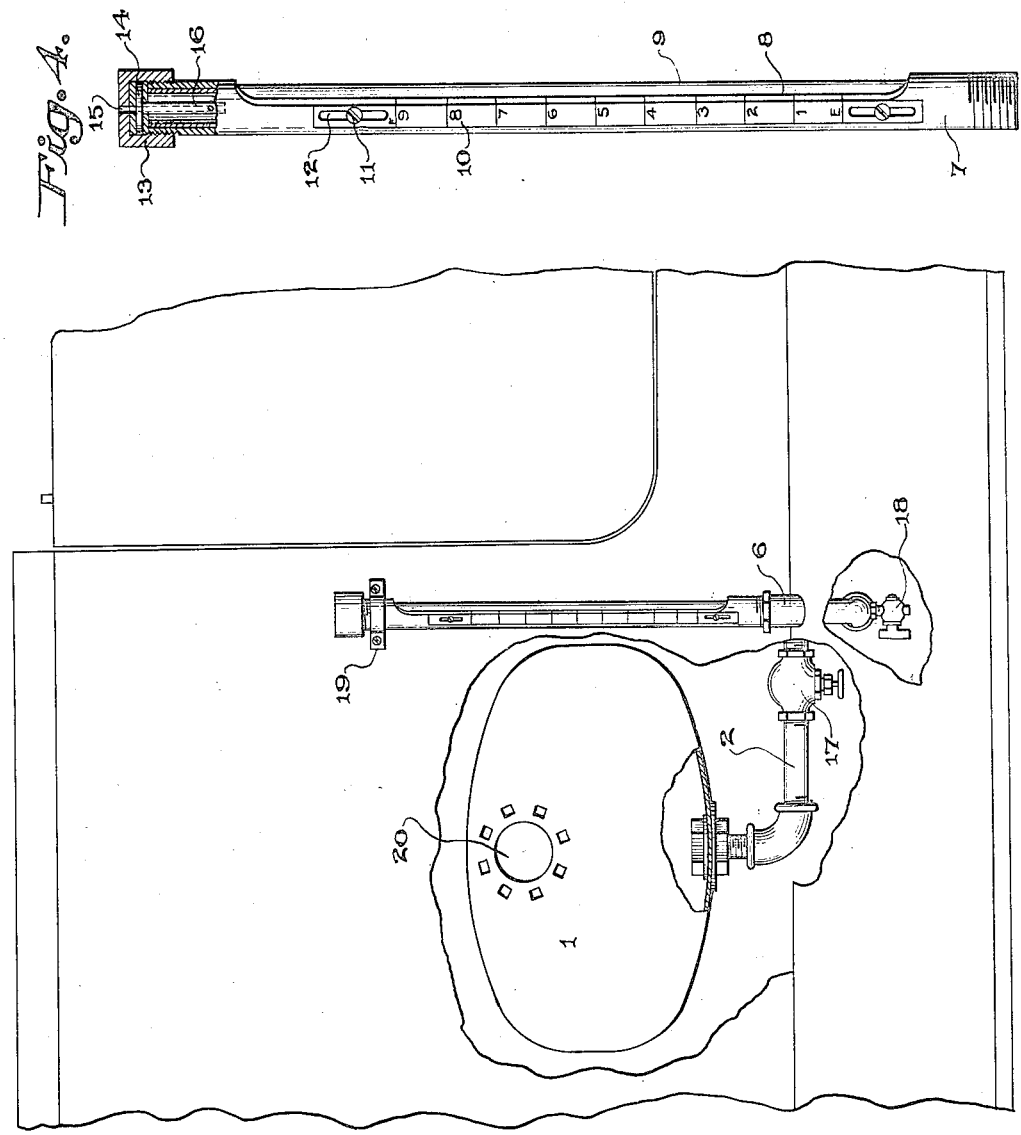

1,477,728

UNITED STATES PATENT OFFICE.

WILFRED H. STEPHENSON, OF SAN ANTONIO, TEXAS.

GAUGE AND FILLER SPOUT FOR GASOLINE TANKS.

Application filed October 9, 1922. Serial No. 593,379.

*To all whom it may concern:*

Be it known that I, WILFRED H. STEPHENSON, a citizen of the United States, residing at San Antonio, in the county of Bexar and State of Texas, have invented new and useful Improvements in Gauges and Filler Spouts for Gasoline Tanks, of which the following is a specification.

In carrying out the present invention it is my purpose to improve and simplify the general construction of gauges and filling spouts for use in connection with gasoline tanks of motor vehicles and to provide a filling spout and gauge which will be found particularly useful in connection with the tank of what is known as a Ford automobile.

It is also my purpose to provide a gauge and filler spout which may be manufactured and marketed at small cost and which will embody comparatively few parts, and these so arranged and corelated as to reduce the possibility of derangement to a minimum.

With the above recited objects in view, and others of a similar nature, the invention resides in the construction, combination and arrangement of parts set forth in and falling within the scope of the appended claim.

In the accompanying drawings:

Figure 1 is a fragmentary side elevation showing my invention installed.

Figure 2 is a fragmentary view in end elevation.

Figure 3 is a view similar to Figure 2 showing a modified form.

Figure 4 is a detail view of the gauge tube.

Figure 5 is an enlarged fragmentary sectional view through the lower end of the gauge tube shown in Figure 3.

Figure 6 is an enlarged fragmentary sectional view through the filling spout connection shown in Figure 3.

Referring now to the drawings in detail, 1 designates a gasoline tank which, in the present instance, is shown as located under the front seat of a Ford automobile. Leading from the bottom of the tank 1 is an outlet pipe line 2 that extends forwardly and has its forward end equipped with an elbow 3 to which is connected a lateral extension 4. The outer end of the lateral extension 4 is equipped with an upstanding elbow 5 arranged beyond the side of the vehicle body, as clearly shown in Figure 2 of the drawings. Connected with the upper end of the elbow 8 by means of a union 6 is the lower end of a gauge. In the present instance the gauge, as clearly shown in Figure 4 of the drawings, comprises an outer tubular metal shell 7 having one side cut away for the major portion of its length, as at 8, and a glass tube 9 arranged within the metal shell 7 and having its major portion on one side exposed through the cut-away portion 8 of the metal shell 7. This gauge glass 9 is capable of vertical adjustment within the shell 7, so that the contents of the tank may be accurately indicated and read by means of indicating marks 10 formed on the shell 7 adjacent to one edge of the cut-out portion 8 thereof, as clearly shown in Figure 4 of the drawings. The gauge glass is maintained in adjusted position by screws 11 working in slots 12 formed in the metal shell 7. Threaded onto the upper end of the metal shell 7 is a cap 13 that closes the upper end of the metal shell and also the upper end of the gauge glass 9 within said shell, and interposed between the top of the cap 13 and the top edges of the metal shell and the gauge glass are washers 14, while formed in the top of the cap is a vent opening 15 that communicates with a vent tube 16 that depends from the cap a short distance into the gauge glass 9.

The pipe line 2 is equipped with a cut-off valve 17, while the elbow 5 is equipped with a drain cock 18.

The gauge is fastened to the outer side of the body of the vehicle by metal straps 19, as clearly shown in Figure 1 of the drawings, so that the level of gasoline in the tank 1 will be at all times visible in order that the quantity of gasoline may be readily determined by the operator of the vehicle.

As shown in Figure 1 of the drawings. one end of the tank 1 is formed with an opening 20 adjacent to the top of such tank, and connected with the opening 20 is the lower end of a filling tube or spout 21 that extends upwardly through an opening in the side wall of the body of the vehicle. This valve tube or spout 21 has its outer end closed by a cap 22 and connecting the top of the tank 1 with the filling tube adjacent to the outer end of the latter is an air escape or vent pipe 23 by means of which the air may be permitted to escape from the tank as the gasoline or other motor fuel is poured into the same by way of the pipe 31.

By means of the construction just described, it will be seen that the filling opening as well as the gauge are located upon the outer side of the body of the motor vehicle, thereby enabling the operator to readily and easily ascertain the quantity of gasoline in the tank and to fill the tank conveniently and quickly whenever necessary and without the necessity of raising the front seat, as it is now universally done in Ford automobiles.

In the modified form of my invention shown in Figures 3, 5 and 6 of the drawings, the bottom of the union 6 is connected through a reducer 24 with one end of a pipe line 25. This pipe line 25 extends across the vehicle beneath the tank 1 and is terminally connected to a trap 26, which, in turn, is connected with the bottom of the tank 1, as clearly shown in Figure 3 of the drawings. Thus, any sediment in the gasoline may be trapped in the trap 26 and drained from such trap by the pet cock 27, cut-off cocks 28 and 29 being located in the gas line 25 and between the trap 26 and the bottom of the tank 1, respectively.

In the modified form of the invention, the filling tube or spout 21 is connected with the top of the tank 1 instead of with the end, and the inner end of the spout designated at 21' is connected by means of a right angular coupling 30 with an opening 31 in the top of the tank. 32 designates a vent pipe that extends through the filling tube so that the air will be released from the tank in the filling thereof.

I have entered into a detailed description of the construction and relative arrangement of parts embraced in the present and preferred embodiments of my invention with a view to imparting a full, clear and exact understanding of the said embodiments. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

The combination with an automobile and a gasoline supply tank arranged beneath the seat thereof, of an angularly disposed filling tube leading from the supply tank and extending to the side of the automobile, and an air vent tube leading from the upper wall of the supply tank through the side of the automobile and communicating with the interior of the filling tube at a point adjacent its upper end.

In testimony whereof I affix my signature.

WILFRED H. STEPHENSON.